United States Patent [19]

Sato

[11] Patent Number: 4,746,932

[45] Date of Patent: May 24, 1988

[54] THERMAL LABEL PRINTER HAVING I/O CAPABILITIES

[75] Inventor: Yo Sato, Tokyo, Japan

[73] Assignee: Kabushiki Kaisha Sato, Japan

[21] Appl. No.: 853,684

[22] Filed: Apr. 18, 1986

[30] Foreign Application Priority Data

Apr. 19, 1985 [JP] Japan .................................. 60-82199

[51] Int. Cl.⁴ ........................ G01D 15/10; B65C 9/18; B41J 3/20; G06K 19/00
[52] U.S. Cl. ............................... 346/76 PH; 346/136; 101/93.04; 101/66; 101/288; 156/384; 156/577; 156/579; 156/DIG. 47; 156/DIG. 51; 235/385; 235/432; 235/487; 235/488; 400/73; 400/103; 400/120

[58] Field of Search .......................... 346/76 PH, 136; 101/93.04, 93.05, 288, 291, 292, 66; 156/384, 570, 577, 579, 584, DIG. 5, 47, 48, 49; 235/378, 383, 385, 432, 472, 487, 488, 494; 400/120, 73, 103

[56] References Cited

U.S. PATENT DOCUMENTS 4,268,179 5/1981 Long et al. .......................... 400/120
4,415,065 11/1983 Sandstedt ............................. 186/39

Primary Examiner—E. A. Goldberg
Assistant Examiner—Gerald E. Preston
Attorney, Agent, or Firm—Ostrolenk, Faber, Gerb & Soffen

[57] ABSTRACT

A portable thermal label printer is provided with a data input, data memory for storing label information data, a program memory, and an input/output port for data communication with external devices.

11 Claims, 3 Drawing Sheets

THERMAL LABEL PRINTER HAVING I/O CAPABILITIES

BACKGROUND OF THE INVENTION

This invention relates, to a thermal label printer, and more particularly, to a thermal label printer capable of receiving from, and transmitting data output to an external device.

Various types of portable data collectors, data terminals and the like have been developed. These devices use a data reader, such as a pen scanner, to scan bar codes or the like. The collector temporarily stores the data read by the data reader. This stored data is supplied to a small printer which prints on ordinary paper for confirmation or later reference. The stored data may also be supplied to a host computer or the like for various types of data processing.

These conventional collectors are disadvantageous in that they are only capable of printing out data on ordinary paper for the purpose of confirmation or future reference. They therefore have only limited applications since they are not capable of reproducing the data for display on articles of merchandise or the like.

SUMMARY OF THE INVENTION

Accordingly, it is an object of the present invention to provide a thermal label printer which is capable of receiving and processing inputted data with an interface for transmitting received or processed data to a host computer or other external device.

It is another object of the present invention to provide a thermal label printer which is capable of printing data on thermal labels for affixing to articles of merchandise and the like, or to files.

It is a further object of the present invention to produce a portable device for tracking and marking packages or the like and having information thereon which utilizes a print medium and a printing unit for printing on the print medium. A first input is used for receiving information contained on the package, while memory is used for storing therein the information contained in the package and for storiing therein predetermined package information. A controller device is connected to the printing unit, the first input device and the memory for controlling the printing device and the memory device. An I/O port is also connected to the controller and is used for data communication with external devices such as a computer.

The present invention attains these objects by providing a thermal label printer comprising a data input such as a pen scanner or keyboard, data memory for storing the data from the data inupt means, a data transmission device for communication with a microcomputer or a host computer, and a printer for printing required data on thermosensitive labels.

DESCRIPTION OF THE PREFERRED EMBODIMENT

Figure 1:
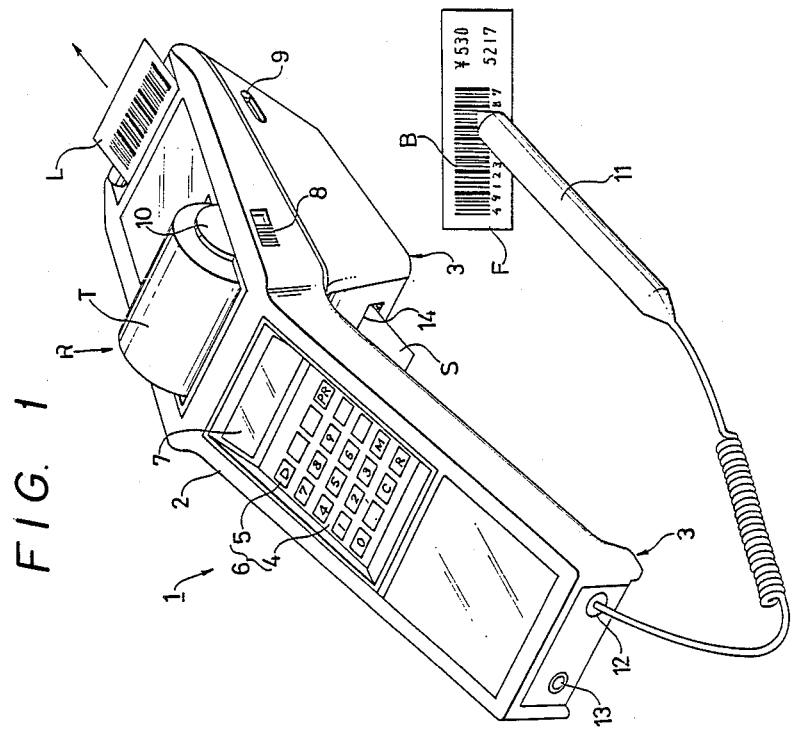
FIG. 1 is a perspective view of an embodiment of the thermal label printer of the present invention.

The thermal label printer 1 shown in FIG. 1 comprises desktop type main unit 2. The unit 2 has a flat bottom surface 3 which can be used for supporting the thermal label printer on any desired flat surface.

Main unit 2 is provided on its top side with a keyboard 6. The keyboard 6 consists of a numeric pad 4 and a number of function keys 5. Above the keyboard 6 is a data display 7 which may, for example, be a liquid crystal display. One side surface of the main unit 2 is provided with a power switch 8. The main unit 2 is provided on either side with an open/close button 9 (only one shown). A support member 10 is used for holding a thermal label roll R consisting of a thermal label strip T wound into a roll. The thermal label strip T comprises a backing sheet S (FIG. 3) bearing numerous labels. After being printed and detached from the backing sheet S, the labels are discharged from the front end of the thermal label printer 1 as indicated by the arrow. A discharge outlet 14 (FIGS. 1 and 2) is used for the backing sheet S which is formed at the rear end of the main unit 2.

At the rear end of the terminal unit 2a there is provided a socket 12 for connecting a pen scanner 11. A socket 13 is used to connect a battery charger 31 to an internal battery 27 (FIG. 2).

The pen scanner 11 is passed over a bar code B which is printed on a shelf tag F. The code represents a merchandise code or the like. The bar code data is inputted in this form to the thermal label printer 1.

The thermal label strip T (FIG. 3) as used in the present invention consists of a continuous series of labels L detachably adhered to a continuous backing sheet S. The labels L have adhesive applied to their rear surfaces while the backing sheet S is coated with a parting agent to facilitate separation of the labels L therefrom. The labels L are intended to be printed with information I and may include a bar code B which represents a merchandise code or a manufacturer code, or a division code or a price. The backing sheet S has holes D for strip T position detection as well as for engagement with the conveyor roller 19 (FIG. 2).

Figure 2:
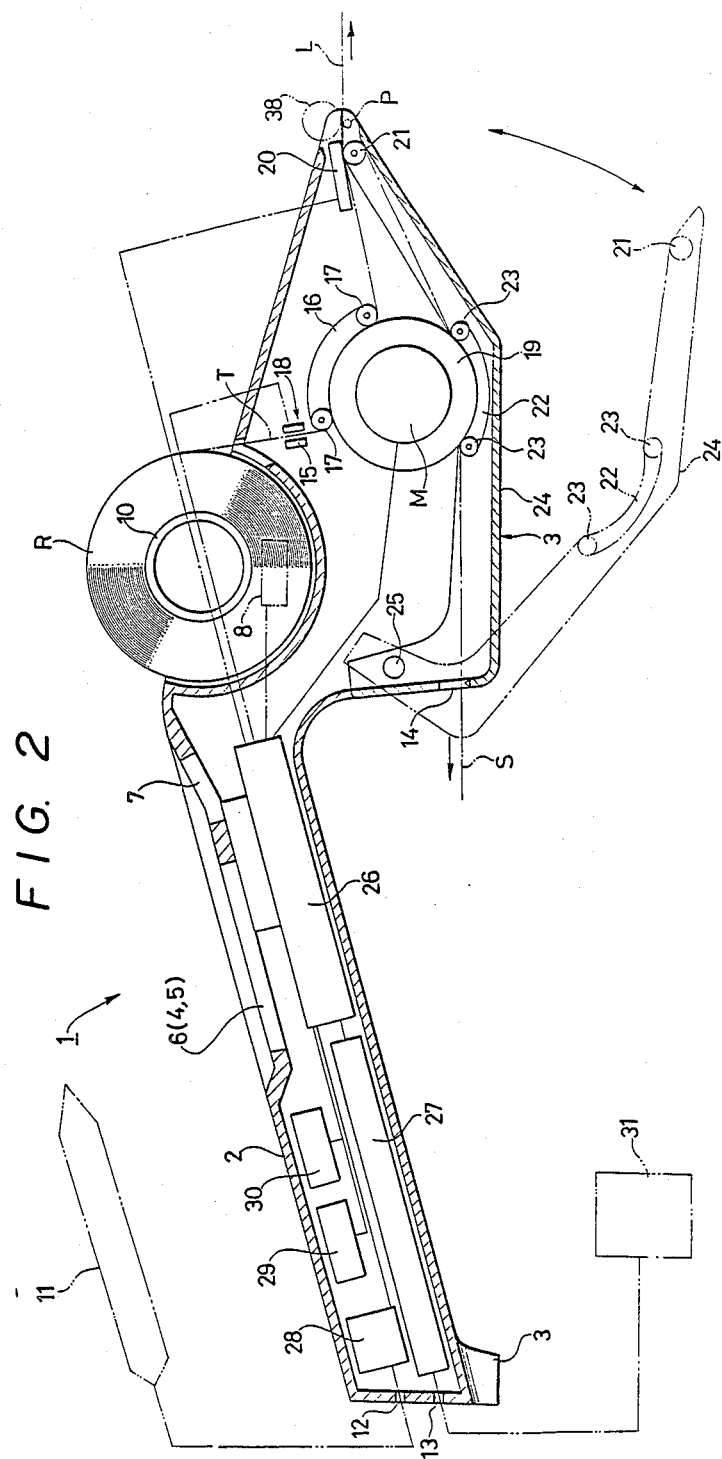
FIG. 2 is a sectional view of FIG. 1.
Figure 3:
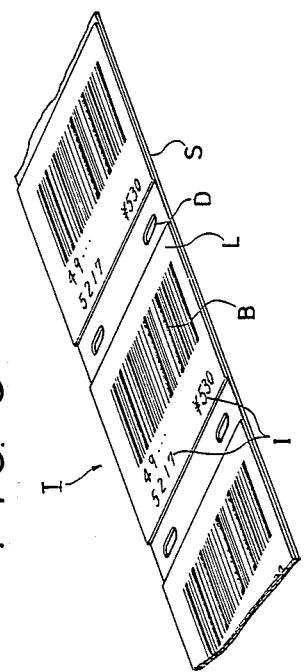
FIG. 3 is a perspective view of a segment of a label strip.

The internal structure of the thermal printer 1 may be seen by referring to FIG. 2. The thermal label strip T is drawn off the thermal label roll supported on the support member 10 of the main unit 2. The strip T is passed along a label strip passage 18 and passes through position sensor 15 and along the guide rollers 17 of an upper press member 16.

The thermal label strip T passes via the conveyor roller 19 to a thermal print head 20 and a platen 21. The strip T is redirected at the platen 21. There the labels L are peeled off, so that just the backing strip is directed for engagement with the conveyor roller 19. The backing is then guided by guide rollers 23 of lower press member 22. The backing sheet S then feeds out from the main unit 2 via discharge outlet 14. A sheet bending pin P (shown in phantom) may be provided in front of the platen 21 as the label peeling means for peeling the labels L from the backing sheet S as the backing sheet S is redirected.

The loading of the label strip T is accomplished by moving the open/close buttons 9 and allowing the bottom cover 23 to swing downwardly about pivot 25 as shown in phantom. This makes it possible to insert a roll of thermal label strip T therein. The bottom cover 24 is coupled to platen 21 and to the lower press member 22 and therefore also swings downwardly. Any conventional type opening/closing mechanism 9 may be used for this purpose, details thereof are not provided. The conveyor roller 19 is driven by the stepped rotation action of stepping motor M and moves the thermal label strip T in the required direction for printing and conveyance.

The control circuit 26, which is housed in main unit 2, is connected to battery 27, an interface 28 for data input from and output to external devices, a ROM program memory 29 for communication and control programs, a RAM data memory 30, and a keyboard 6. The display 7, sensor 15, thermal print head 20 and stepping motor M are connected and controlled by control circuit 26. The battery 27 is preferably a rechargeable type and can be connected via socket 13 to an external battery charger 31.

Figure 5:
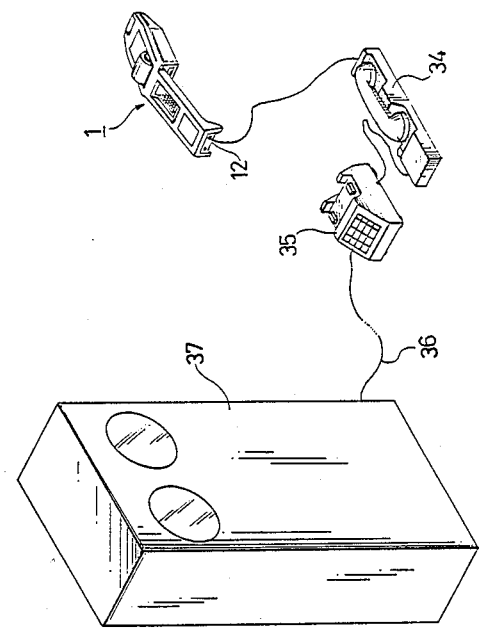
FIG. 5 is a view showing how the thermal printer is connected to a host computer.
Figure 4:
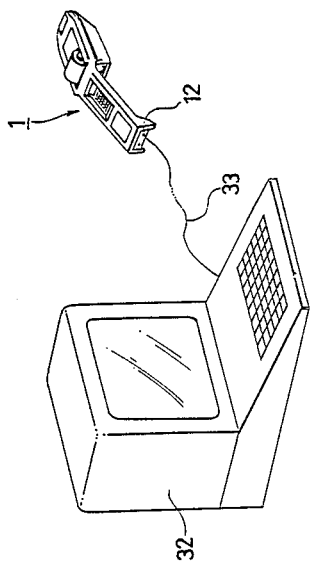
FIG. 4 is a perspective view showing how the thermal label printer according to the present invention is connected to a microcomputer.

FIG. 4 shows the thermal label printer 1 connected to a microcomputer 32 thereby allowing I/O data operations therebetween. This data may be transferred to microcomputer 32 via socket 12 by use of a cable 33. Alternately, an acoustic coupler 34 (FIG. 5) may be used to link the printer 1 to a large host computer 37 via a telephone 35, and any suitable wired or wireless link.

The operation of the present invention will now be described with reference to an application for replenishing stock at a supermarket or the like.

Accordingly, an operator carries the thermal label printer 1 and the pen scanner 11 to a merchandise display shelf. The operator scans a shelf tag F, thus inputting the merchandise code and other pertinent data to the thermal label printer 1. The keys of the numeric pad 4 are then used to input the quantity of merchandise to be ordered to bring the stock up to the desired level. This inputted data is displayed on the display 7 so that the operator is able to confirm its accuracy. The operator then repeats the process moving to succeeding shelves or racks.

The inputted data is temporarily stored in the data memory 30. After the work of inputting the data for stock replenishment has been completed, it may then be transmitted from the thermal label printer 1 to a data processing device such as a microcomputer 32 or a host computer 37 via interface 28 and socket 12.

The required labels L may now be printed out by the printer 1 after the input order data has been processed and the ordered merchandise has arrived. This is possible because the merchandise codes, order quantity data and other such requisite information are stored in the data memory 30. Therefore, the operator need only press the function key 5 marked PR. This causes the conveyor roller 19 to advance the thermal strip T and to activate the thermal print head 20. Labels L, or the required bar codes B corresponding to the stored information are then printed. As the backing sheet S is redirected at the platen 21, the labels L are peeled from the backing sheet S and fed out from the main unit 2, so that each label may be applied to the merchandise. However, an application roller 38 (FIG. 2) may be provided in front of the platen 21, if large numbers of labels need to be applied.

Since the labels can be printed just by pressing the PR function key, the need to manually input each and every merchandise code and quantity data such as has been conventionally required is eliminated.

As an example, the printer according to the present invention will now be described with reference to the reduced-price selling of merchandise at closing time by a supermarket tenant store, such as a butcher, a greengrocer or the like.

Conventionally, such stores have employed a measuring printer or like means to weigh their merchandise beforehand and apply labels thereto, each printed with prices corresponding to the measured weight. However, when closing time approaches, such stores generally cut their prices in order to clear their stock that day, as the value of such merchandise lies in its freshness.

Because conventional measuring printers are located in a merchandise arrival area or other specified location, it has been necessary to check the merchandise while printing out the labels, which is troublesome. Further, this made it difficult to collect price data on merchandise that had been reduced in price and caused problems between tenants and the supermarket owner when rents, which are based on sales volume, were calculated.

However, with the present printer 1, the pen scanner 11 may be used to scan a printed bar code B corresponding to a price reduced to a preset level, or a reduced price inputted via the numeric pad 4. A label L may then be printed which is affixed to the merchandise to indicate the reduced price. At the same time, the reduced price data is stored in the data memory 30 for subsequent uploading to a microcomputer 32 or a host computer 37 where the reduced price data can be processed into slips, providing accurate handling of such data, and thereby minimizing disputes between the supermarket owner and the tenant.

It is to be noted that the structure of the thermal label printer may be simplified, if desired, by omitting the keyboard and providing only the pen scanner 11 or a touch scanner as the data input means. Also, the display may be omitted or another input socket 12 may be provided. Further, where it is desired to make the thermal label printer more easily portable, a handle (not shown) may be provided on the bottom of the main units 2. This handle may be of either fixed, detachable or a foldable type.

Although the present invention has been described with reference to an application for replenishing stock or reduced price selling, the invention is not limited to these applications. The thermal label printer may also be used for the input and output of data relating to various types of merchandise and other articles, using a pen scanner, keyboard or any of the various other kinds of data I/O means. This packaged related data may be uploaded to and/or received from a central computer with labels printed accordingly. The present invention is therefore widely applicable when labels have to be printed in accordance with various types of data transactions. Therefore, the present invention performs many applications which could not be handled by conventional printers.

Potential applications for the present thermal printer 1 may include inventory control of retail outlets, management of business data files, printing of blood data cards and sample tube labels at blood banks, printing of bar code labels for patient charts and medical certificates at hospitals and clinics, process, parts and inventory control in factories, printing of confirmation labels at parcel reception/dispatch points, and for the management of customer data, and data and printing of labels relating to outside suppliers at department stores and supermarkets.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A portable device for receiving information located on packages and for printing data on a print medium for the packages, the device comprising:

first input means for receiving the information located on the packages;

memory means for storing the information located on the packages and for storing predetermined package related data;

a printer for printing the data on the print medium;

control means connected to the printer, to the first input means and to the memory means for receiving the information from the first input means and for transferring the information to the memory means, for developing data, based on the predetermined package related data and the information contained on the packages, which data is to be printed on the print medium, and for controlling the printer unit means and the memory means to retrieve the data from the memory means and to cause the data to be printed, by the printer on the print medium; and I/O port means connected to and controlled by the control means and effective for providing bi-directional data communications between the portable device and an external electronic data processing device, the control means being effective to enable the information received by the first input means and the predetermined package related data to be transmitted to the external data processing device and to enable transmission of the package related data from the external data processing device to the memory means of the portable device.

2. A portable device according to claim 1, wherein said external device comprises a computer.

3. A portable device according to claim 1, wherein the printer comprises a thermal printer.

4. A portable device according to claim 1, wherein said first input means comprises a keyboard.

5. A portable device according to claim 1, wherein said first input means comprises a pen scanner.

6. A portable device according to claim 1, wherein said information contained on said packages is in the form of a bar code.

7. A portable device according to claim 1, further comprising alignment holes disposed at predetermined positions in said print medium and further comprising a print medium position detection means adjacent said alignment holes for registering the relative position of said print medium in said printing means.

8. A portable device according to claim 7, further comprising a print medium passage and a print medium transport means connected to said print medium and to said control means, said transport means moving said print medium in response to printing by said printer on said print medium, said print medium being disposed in said print medium passage.

9. A portable device according to claim 1, wherein said external device comprises a host computer.

10. A portable device according to claim 1, wherein said external device comprises a microcomputer.

11. A portable device according to claim 1, wherein the print medium comprises a plurality of labels which are detachably adhered to the backing sheet.

* * * * *